United States Patent [19]

Mattmuller

[11] 4,110,098

[45] Aug. 29, 1978

[54] MOLTEN GLASS REFINING APPARATUS

[75] Inventor: René Mattmuller, Malakoff, France

[73] Assignee: Saint-Gobain Industries, Neuilly-sur-Seine, France

[21] Appl. No.: 767,390

[22] Filed: Feb. 10, 1977

Related U.S. Application Data

[63] Continuation-in-part of Ser. No. 602,670, Aug. 7, 1975, abandoned.

[30] Foreign Application Priority Data

Feb. 12, 1976 [FR] France .................................. 76 03813
Aug. 14, 1974 [FR] France .................................. 74 28188

[51] Int. Cl.² .............................................. C03C 5/02
[52] U.S. Cl. ........................................ 65/141; 65/136; 65/20; 65/337; 65/347
[58] Field of Search .................... 65/20, 22, 141, 136, 65/337, 347

[56] References Cited

U.S. PATENT DOCUMENTS

| 1,759,228 | 5/1930 | Drake | 65/347 X |
| 2,283,188 | 5/1942 | Cornelius | 65/347 X |
| 2,322,581 | 6/1943 | Lytle | 65/141 X |
| 2,593,197 | 4/1952 | Rough | 65/136 |
| 2,832,958 | 4/1958 | Penberthy | 13/2 |
| 3,268,320 | 8/1966 | Penberthy | 65/178 |
| 3,885,945 | 5/1975 | Rees et al. | 65/136 |
| 3,897,234 | 7/1975 | Froberg | 65/337 X |

FOREIGN PATENT DOCUMENTS

| 644,561 | 6/1928 | France. |
| 1,011,651 | 4/1952 | France. |
| 1,165,096 | 5/1958 | France. |
| 1,251,948 | 12/1960 | France. |
| 2,281,902 | 3/1976 | France. |
| 288,668 | 6/1953 | Switzerland. |
| 200,900 | 7/1923 | United Kingdom. |

Primary Examiner—Arthur D. Kellogg
Attorney, Agent, or Firm—Pennie & Edmonds

[57] ABSTRACT

The improvement in an apparatus for refining glass being fed along a channel wherein the molten glass is foamed throughout its thickness, the improvement involving an increase in the width of the channel at the location of foaming. Also, the channel is provided with submerged electrodes disposed on opposite sides of the channel adjacent the bottom for heating the molten mass to produce the foaming.

17 Claims, 2 Drawing Figures

MOLTEN GLASS REFINING APPARATUS

RELATED APPLICATION

This application is a continuation-in-part of applicant's copending application Ser. No. 602,670, filed Aug. 7, 1975, entitled "Method and Apparatus for the Manufacture of Glass", now abandoned.

BACKGROUND OF THE INVENTION

In copending U.S. application Ser. No. 602,670 filed Aug. 7, 1975 now abandoned and entitled "Method and Apparatus for the Manufacture of Glass", a rapid process of melting and refining glass is described in which a vitrifiable material is melted and brought to an elevated temperature while maintaining the viscosity of the molten mass at less than 1000 poises. As soon as the melting has been achieved, an intense foaming of the molten mass is effected throughout its entire thickness while keeping the viscosity at a value less than 1000 poises. The rate of expansion of the mass is at least 1.5 (preferably between 2 and 3). After the foaming subsides, a perfectly refined glass is collected.

According to the process disclosed in said copending application, the foaming operation is performed in a channel in which the molten material progresses, without back currents, from a first location where the raw vitreous material is received from a premelting apparatus and a second location where the refined glass is recovered.

To ensure the intense and complete foaming required, a number of steps may be taken. For example, foaming agents can be incorporated into the raw materials. The foaming agents give rise, in the temperature range, corresponding to the desired viscosities, to the formation of gas bubbles inside the glass. The gases produced by the foaming agents are soluble in glass, and preferably their solubility in the molten glass increases as its temperature decreases. It is also recommended that a refining agent be present, at least in the final phase. After the elimination of most of the gases, the refining agents aid in the readsorption of the bubbles which remain on cooling. The foaming agents are selected such that they do not induce foaming of the vitreous material until that material has reached a desired temperature, which temperature is maintained in the refining channel. The following foaming agents are useful in the process disclosed in said copending application: arsenic compounds, such as arsenic trioxide; antimony compounds such as antimony trioxide; sulfur compounds, such as sodium sulfate; and halogen salts such as potassium chloride. Other agents useful in the process will be apparent to those skilled in the art.

Another method disclosed in said copending application for ensuring the thorough foaming of the molten mass involves subjecting the batch to rapid uniform heating during the foaming operation of about 20° C. per minute or more.

In a discontinuous melting installation, the heating means are employed at a time when the vitreous batch contains a large number of solid or gaseous nuclei and a sufficient amount of foaming agents to ensure an expansion of at least 1.5, and preferably above 2 times the normal volume of the mass in the unfoamed molten state.

In a continuous melting installation similar heating means can be employed. The predefined time sequence corresponds to the rate of treatment of the vitreous mass.

To aid the foaming process, it is also recommended that the raw materials contain a large number of nuclei, such as unmelted particules or small gas bubbles, capable of inducing the foaming. These nuclei essentially act as nucleation sites. The nuclei should be distributed throughout the molten mass at a concentration of at least 10 nuclei per cc. Generally, it is desirable that the raw materials be agglomerated. The agglomeration makes it possible to preheat the materials before actual melting. The preheating is accomplished by a brief and intense heat transfer (less than 10 minutes) while simultaneously keeping the temperature of the materials below the foaming temperature. This permits the maintenance of a high number of nuclei consisting of unmelted particles and gas bubbles in the vitreous mass introduced into the total foaming stage.

To assure the presence of sufficient nuclei, outside nuclei, for example, cullet or colored cullet can be added to the raw materials. In relation to the usual glass refining processes, the process disclosed in said copending application, requiring the presence of gas producing agents and foaming nuclei, can employ unrefined vitreous materials. It has been discovered that 1 to 2 mm. grains originating from the limestone and dolomite in the material introduced in the refining tank, are totally digested at the end of the total foaming phase. The process is therefore not dependent on the use of a vitreous batch of high quality.

The channel in which the molten mass flows can be of very simple geometry. Preferably, it has a slight width in relation to its length, in a ratio of 1:5 at least. This construction limits undesirable back currents. Also, for this same purpose, it is possible to use baffles, barriers, bottlenecks or even cascades along the path traveled by the vitreous molten mass during treatment in the channel of the refining apparatus.

SUMMARY OF THE PRESENT INVENTION

According to the present invention, the channel of the refining apparatus is constructed to increase the homogeneity of the foaming of the molten mass throughout its entire thickness. The construction of the channel also enhances the uniform flow of the molten mass. More particularly, the channel is constructed with a widening in the middle zone where, due to the rapid heating of the molten mass, the great expansion and foaming of the mass is produced. The width of the channel at the zone of foaming is about double that of the upstream zone. Downstream from the foaming zone, the channel returns to a narrow width, for example, on the same order as that of the upstream zone.

The channel is equipped with pairs of opposed electrodes placed on opposite sides of the channel along the longitudinal refractory walls of the apparatus. The dissipation of energy by Joule effect is produced within the vitreous mass itself to control the temperature of the mass all along the channel. In the foaming zone, the spacing of opposed electrodes is greater than the spacing between the upstream electrodes. Advantageously, the spacing between the electrodes in the foaming zone is at least equal to the width of the channel of the upstream zone.

DETAILED DESCRIPTION OF THE PREFERRED EMBODIMENT

Figure 1:
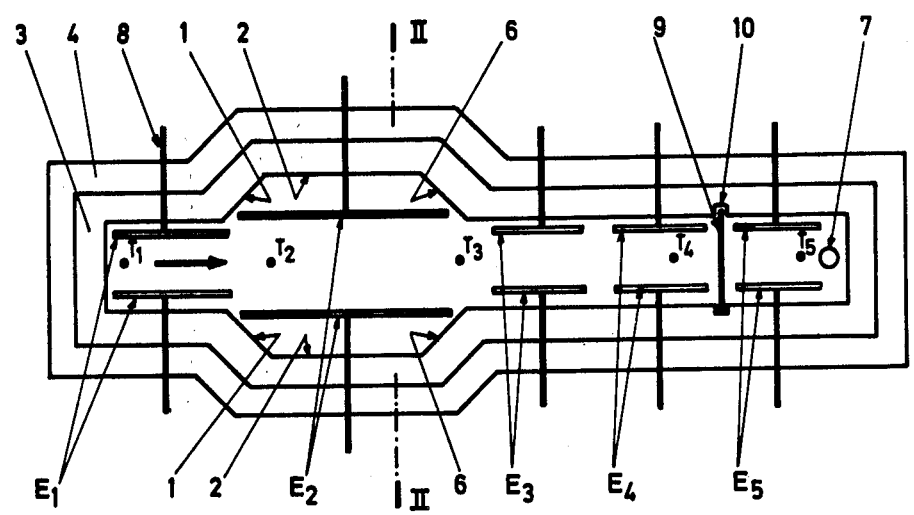
FIG. 1 is a plan view of the channel constructed in accordance with the present invention.

In FIG. 1, the direction of the arrow indicates the direction of flow of the molten mass between electrodes $E_1$. The channel walls diverge at 1 to define the entrance of the foaming or widened zone 2. The electrodes $E_2$ in the foaming zone are placed at a distance apart greater than the width of the channel upstream. Thus, the totality of the molten glass mass that comes from there enters between electrodes $E_2$. The length of the widened foaming zone corresponds to the period of the intense foaming phase disclosed in the above-mentioned copending application.

The wall of the foaming zone is moderately heat insulated to maintain its temperature at a rather low level (on the order of 1350° C.), whereas the glass in foam state between electrodes $E_2$ is around 1550° C. From this important heat gradient, there results, around each electrode $E_2$, a notable convection current, helicoidal in shape in the direction indicated by the arrows represented in FIG. 2. This causes an intense mixing of the molten glass mass particularly favorable to its refining.

Figure 2:
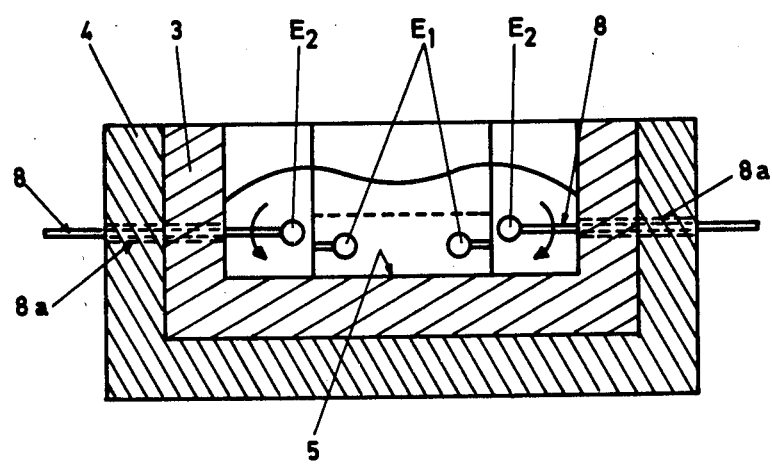
FIG. 2 is a cross-sectional view of the channel, in the widened or foaming zone as taken along lines II—II of FIG. 1.

The glass has free passage around the electrodes along the hearth and side walls. Passage of the current from one electrode to the other produces active thermal convection which favors the crosswise homogenization of the molten mass and eliminates any major longitudinal currents. The result is a uniform flow of glass called a "piston" flow. In FIG. 2, the level of molten mass before foaming is shown by the broken lines while that of the foam is shown by the solid lines.

By way of example, an embodiment of the invention for refining glass at a production capacity on the order of 120 to 250 kg/hour, for the usual silica-soda-lime glass, is given below.

The walls and hearth of the channel are made up of blocks of electro-melted refractory 3 with a base of alumina and zirconia about 10 cm. thick, heat insulated by a lining 4 of refractory bricks. To obtain a moderate heat insulation in the widened foaming zone 2, a thiner lining thickness 4 is used. The hearth 5 of the channel is level on its entire surface.

The depth of the channel is 25 cm., uniformly over its entire length, which totals 2.5 m. The narrow upstream zone, in which receipt of the premelted mass occurs, is 30 cm. wide and 40 cm. long. The two electrodes $E_1$ in this zone are made of molybdenum rods 40 mm. in diameter and 40 cm. long. They are placed symmetrically and 150 mm. apart.

After this upstream zone, the widened foaming zone extends for a total length of 80 cm. It includes the entrance 1 where the walls diverge over a length of 15 cm. This increases the width of the channel from 30 to 60 cm., this latter value being maintained over a length of 50 cm. The channel then comprises a narrowing portion 6 where, over a length of 15 cm., the walls converge to reduce the width of the channel from 60 to 30 cm. This reduced width is then maintained over the downstream zone, for a length of 1.3 m., to the drawing off orifice 7, whose output is controlled by a needle system, not shown.

Electrodes $E_2$ in the widened foaming zone are made of cylindrical molybdenum rods 40 mm. in diameter and are 70 cm. long. The pairs of electordes $E_3$, $E_4$ and $E_5$ in the downstream zone of the channel are of the same diameter (40 mm.) and are 30 cm. long. For the areas where the molybdenum is in contact with the molten mass, even in the upstream zone and in the widened foaming zone where the mass is charged with bubbles of various gases, it has been found that with the usual compositions of silica-soda-lime glass, no particular precautions need be taken for the protecting of this metal from oxidation.

The current lead-ins 8 to the electrodes are also molybdenum rods, but their diameters are only 25 mm. Assembly of the lead-in and electrode is accomplished by screwing of one into the other. In the areas where there is a danger of oxidation of the molybdenum of the lead-ins, they are protected, as is known, by a reducing gas such as town gas. The connecting clamps to the electric supply are cooled by circulation of liquid. The lead-ins can slide in passages 8a which are made through the walls of the channel. The height of the axes of these passages is 5 cm. above the level of the hearth except for electrodes $E_2$ whose height is 2 cm. greater.

Between the pair of electrodes $E_4$ and $E_5$, a barrier of refractory material or platinum is placed to provide a passage of adjustable height between its lower part and the hearth 5. The barrier blocks possible surface currents; and is slidably mounted in guides 10 in the lateral walls of the channel to control the flow of molten mass.

Heating of the molten mass contained in the channel is assured by means of the immersed electrodes, previously described, with independent electric power supply for each pair of electrodes. An example of the rated electrical characteristics of the power supply is as follows:

| Powers Used | Power Capacity (kVA) | Voltage (V) | Current Amperage (A) |
| --- | --- | --- | --- |
| electrodes $E_1$ | 40 | 80 | 500 |
| electrodes $E_2$ | 40 | 80 | 500 |
| electrodes $E_3$ | 7.5 | 120 | 62.5 |
| electrodes $E_4$ | 7.5 | 120 | 62.5 |
| electrodes $E_5$ | 15 | 120 | 125 |

The above-described construction and power supply permits refining of about 150 kg/hour of silica-soda-lime glass under operating conditions shown in the following table, the temperatures being those indicated by pyrometers going into the molten mass at points indicated $T_1$ to $T_5$ in FIG. 1:

| Powers Used | Values (kVA) | Temperatures Measured | Values (° C) |
| --- | --- | --- | --- |
| electrodes $E_1$ | 15 | Point of Measurement $T_1$ | 1300 |
| electrodes $E_2$ | 22 | Point of Measurement $T_2$ | 1480 |
| electrodes $E_3$ | 1 | Point of Measurement $T_3$ | 1540 |
| electrodes $E_4$ | 1 | Point of Measurement $T_4$ | 1400 |
| electrodes $E_5$ | 0 | Point of Measurement $T_5$ | 1250 |

The operating conditions correspond to a supply of premelted paste delivered at about 1350° C. by a melting apparatus of the type disclosed in the above-mentioned copending application in which the following vitrifiable mixture (in kg. per 100 kg. of glass) is introduced in the form of agglomerates.

| | |
| --- | --- |
| sand | 67.0 |
| limestone | 9.47 |

-continued

| | |
|---|---|
| dolomite | 16.2 |
| feldspar | 6.13 |
| sodium carbonate | 7.58 |
| 50% caustic soda | 22.5 |
| sodium sulfate | 1.0 |

The minimum level of the unexpanded molten glass mass should be on the order of 10 cm. to cover, and therefore protect from oxidation, the totality of the various pairs of electrodes disposed along the channel, even if the rate of expansion is small. In practice, in the installation described, the rate of expansion of about 2 permits optimal functioning, while leaving a safety space of 5 cm. above the molten mass.

Devices with greater production capacity can be made in a way similar to the above-described embodiment. Appropriate electrical heating means must be provided in relation to the contemplated output, i.e., heating means with a capacity to assure an elevation of temperature of the vitreous mass of at least 20° C./minute at the level of the widened foaming zone. Also, if the thickness of the molten glass mass is increased, the electrodes are still kept close to the hearth, as indicated above, so that the heat will directly affect the deepest layers of the mass to be treated. Thus, unwanted currents of longitudinal convection are reduced, to the benefit of the quality of the refining. For similar reasons, particular care is given to heat insulation of the hearth while the arch and walls are, optionally, as stated above, slightly less heat insulated to favor transverse convection movements.

I claim:

1. The improvement in an apparatus for refining glass comprising:
   (a) an elongated continuous flow refining channel in which a molten vitreous mass is introduced at one end thereof and flowed horizontally therethrough to an exit at its other end;
   (b) a localized foaming zone extending along a predetermined length of said channel and spaced from the one end thereof, said foaming zone having a width appreciably wider than the channel upstream of said foaming zone; and
   (c) heating means submerged along the length of said channel for subjecting the flowing molten mass in said foaming zone to an expansion of at least 50% of its initial molten volume by foaming the flowing molten mass in said foaming zone throughout its entire volume as the mass moves along the channel from its one end to the other end.

2. The apparatus according to claim 1 wherein:
   (a) the width of the channel in said foaming zone is about twice the width of the channel upstream thereof.

3. The apparatus according to claim 2 wherein:
   (a) the width of the channel downstream of the foaming zone is about equal to the width upstream of the foaming zone.

4. The apparatus according to claim 3 wherein:
   (a) the length of the channel is about eight times the width of the channel upstream and downstream of the foaming zone; and
   (b) the length of the foaming zone is about twice that of the channel upstream thereof.

5. The apparatus according to claim 2 wherein the improvement further includes:
   (a) a plurality of pairs of electrodes positioned in opposed relation along opposite sides of the channel in submerged relation to the molten mass.

6. The apparatus according to claim 5 wherein:
   (a) the electrodes have a heating capacity sufficient to increase the temperature of the molten mass by at least 20° C. per minute.

7. The apparatus according to claim 5 wherein:
   (a) the opposed electrodes of each pair extend parallel to each other and to the sides of the channel in spaced relation thereto; and
   (b) the spacing between the electrodes in the foaming zone is at least equal to the width of the channel upstream of the foaming zone.

8. The apparatus according to claim 7 wherein:
   (a) the electrodes extend horizontally near the bottom of the channel; and
   (b) a single pair of electrodes is disposed in said foaming zone and extends substantially the length of the foaming zone.

9. The apparatus according to claim 8 wherein:
   (a) the spacing of the electrodes from the sides of the channel is greater in the foaming zone than along the remainder of the channel.

10. The apparatus according to claim 8 wherein:
    (a) the spacing of the electrodes in the foaming zone is about equal to the width of the channel upstream of the foaming zone.

11. The apparatus according to claim 10 wherein:
    (a) the width of the channel downstream of the foaming zone is equal to the width upstream of the foaming zone;
    (b) the length of the channel is about eight times the width of the channel upstream and downstreamm of the foaming zone; and
    (c) the length of the foaming zone is about twice that of the channel upstream thereof.

12. The apparatus according to claim 11 wherein:
    (a) the sides of the channel are more moderately insulated in the foaming zone than upstream and downstream thereof.

13. In an apparatus for rapidly refining glass of the type having an elongated continuous channel in which a molten vitreous mass is introduced at one end thereof, flowed horizontally therethrough and subjected to an expansion of at least 50% of its initial molten volume by foaming the molten mass throughout its entire volume as the mass moves along the channel from its one end to the other end, the improvement comprising:
    (a) a plurality of pairs of submerged electrodes horizontally positioned throughout the length of the channel is opposed relation along opposite sides of the channel and adjacent the bottom thereof.

14. The improvement in an apparatus for refining glass comprising:
    (a) an elongated continuous flow refining channel in which a molten vitreous mass is introduced at one end thereof and flowed horizontally therethrough to an exit at its other end;
    (b) a localized foaming zone extending along a predetermined length of said channel adjacent said one end thereof;
    (c) first heating means disposed longitudinally along said channel in said foaming zone at a location spaced from the sides and bottom of said channel and below the surface of said vitreous mass for rapidly heating the flowing vitreous mass to cause its entire volume to pass totally to the foam state while in said foaming zone;

(d) second heating means disposed longitudinally along the remainder of the channel longitudinally of said foaming zone for heating the flowing vitreous mass; and (e) said first and second heating means being positioned relative to the sides and bottom of said channel and of a sufficient power to generate sufficient heat and produce active transverse thermal convection in said flowing vitreous mass along said channel preventing longitudinal currents tending to mix the vitreous mass of one area of said channel with that of another.

15. The improvement in the apparatus of claim 14 wherein:

(a) said first and second heating means comprise electrodes spaced from the sides and bottom of said channel and positioned below the surface of said vitreous material.

16. The improvement in the apparatus of claim 15 wherein:

(a) the electrodes have a heating capacity sufficient to increase the temperature of the molten mass by at least 20° C. per minute.

17. The improvement in the apparatus of claim 16 wherein:

(a) the width of the channel in said foaming zone is appreciably wider than the width of the channel downstream of said foaming zone.

* * * * *